US011294790B2

(12) United States Patent
Tate et al.

(10) Patent No.: US 11,294,790 B2
(45) Date of Patent: Apr. 5, 2022

(54) SYSTEM AND METHOD FOR AUTOMATING TESTING OF NONFUNCTIONAL REQUIREMENTS

(71) Applicant: JPMorgan Chase Bank, N.A., New York, NY (US)

(72) Inventors: Edwin L Tate, Frankfort, IL (US);
Navdeep Raheja, Chicago, IL (US);
Firasath Ali, Flower Mound, TX (US);
Roberto C Rizo, Berwyn, IL (US);
Abinadi Cordova, Riverview, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/991,438

(22) Filed: Aug. 12, 2020

(65) Prior Publication Data
US 2022/0050766 A1    Feb. 17, 2022

(51) Int. Cl.
*G06F 11/36* (2006.01)
*G06F 9/54* (2006.01)
*G06F 11/34* (2006.01)

(52) U.S. Cl.
CPC ......... *G06F 11/3608* (2013.01); *G06F 9/54* (2013.01); *G06F 11/3466* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 10,430,321 B1* | 10/2019 | Li | ...................... | G06F 11/3684 |
| 10,496,530 B1* | 12/2019 | Angermayer | ....... | G06F 11/3688 |
| 10,558,445 B2* | 2/2020 | Cillis | ...................... | G06F 8/60 |
| 2011/0082715 A1* | 4/2011 | Chen | ...................... | G06F 8/36 |
| | | | | 705/7.11 |
| 2013/0055194 A1* | 2/2013 | Weigert | .................. | G06F 8/355 |
| | | | | 717/104 |
| 2013/0055195 A1* | 2/2013 | Weigert | ................... | G06F 8/30 |
| | | | | 717/104 |
| 2018/0314622 A1* | 11/2018 | Lowe | .................. | G06F 9/44526 |
| 2019/0068631 A1* | 2/2019 | Ashkenazy | ......... | H04L 63/1433 |
| 2019/0213105 A1* | 7/2019 | Jose | .................... | G06F 11/3692 |
| 2020/0273582 A1* | 8/2020 | Ben Gad | .............. | A61B 5/4824 |
| 2021/0124576 A1* | 4/2021 | Gungabeesoon | ... | G06F 11/3692 |

* cited by examiner

*Primary Examiner* — Philip Wang
(74) *Attorney, Agent, or Firm* — Greenblum & Bernstein, P.L.C.

(57) ABSTRACT

Various methods, apparatuses/systems, and media for implementing an automation testing module are disclosed. A processor creates a plurality of production robots each configured to validate a particular nonfunctional requirement (NFR) among a plurality of NFRs of an application during a development environment of the application. The processor identifies a tool specific for testing the particular NFR from the plurality of production robots; and implements the identified tool's application programming interface (API) to automatically execute a test scenario to validate the particular NFR. The test scenario is selected from a plurality of test scenarios to be executed and tested by the production robots to validate each NFR during the development phase and to determine that the application is stable and ready for production based on validation of the plurality of NFRs prior to entering into a production phase of the application.

18 Claims, 6 Drawing Sheets

SYSTEM AND METHOD FOR AUTOMATING TESTING OF NONFUNCTIONAL REQUIREMENTS

TECHNICAL FIELD

This disclosure generally relates to automated testing of software application, and, more particularly, to methods and apparatuses for implementing an automation testing module for automating the testing of nonfunctional requirements of a software application from an operational perspective.

BACKGROUND

As software application becomes increasingly more complex, testing such software application also becomes more complex as a large number of unique combinations of paths and modules may be tested for each program. Conventional tools exist for automating software application testing. However, conventional tools may only provide for manual automation of software application testing (i.e., manual initiation/launching of the automation testing after development of a software application during the testing phase, consulting with developers whether they met the requirements, etc.), and may lack frameworks for automating the testing of nonfunctional requirements of a software application during lower environments, e.g., development environments in a software development phase. For example, currently, the software application has to be in a higher environment, e.g., in production environments or production-like environments in order to perform test on the software application. Thus, conventional testing may result identifying a flaw or a plurality of flaws in nonfunctional requirements (e.g., resiliency, performance, monitoring, logging, etc.) all the way in the production or production-like environments, thereby resulting a significant delay in testing and production.

For example, in production management, teams traditionally may spend more time on reactive work versus proactive work resulting in an unsatisfactory customer experiences, team fatigue and increased cost to manage support teams at scale. While conventional DevOPS engines may help address some of the problem, one may still find that the operational focus required may be challenged at times based on other functional delivery priorities and operations experiences. Other conventional approach, such as SRE (site reliability engineering), has been more focused on telemetry versus proactive measures prior to production delivery. In addition, today, most developers may be faced with a challenge that they no longer have months to review and manage changes like in waterfall (i.e., traditional and linear approach to development and project management) to weekly, if not daily, production deploys in agile. Thus, there may be a need for a different approach than these conventional approaches to improve production management.

SUMMARY

The present disclosure, through one or more of its various aspects, embodiments, and/or specific features or sub-components, provides, among other features, various systems, servers, devices, methods, media, programs, and platforms for implementing an automation testing module for creating a plurality of production robots (i.e., various modules programmed to perform certain tasks) that focus on validating readiness of an application for production in the lower environments (i.e., in development environment or other lower environments prior to entering into production environment) by automatically testing frequently (or continuously) that nonfunctional requirements are met for resiliency, performance, monitoring, logging and other requirements identified for stability, but the disclosure is not limited thereto. The present disclosure, through one or more of its various aspects, embodiments, and/or specific features or sub-components, also provides, among other features, various systems, servers, devices, methods, media, programs, and platforms for implementing an automation testing module for creating a plurality of production robots that, for any escapes of testing that make it to production environment, detect problems and orchestrate actions to remediate and prevent/reduce customer impacts, thereby allowing teams to spend more time focused on increasing the capabilities of the robots proactively versus reacting to incidents, but the disclosure is not limited thereto.

According to an aspect of the present disclosure, a method for implementing an automation testing module for automated nonfunctional testing by utilizing one or more processors and one or more memories is disclosed. The method may include: creating a plurality of production robots each configured to validate a particular nonfunctional requirement (NFR) among a plurality of NFRs of an application during a development phase of the application; identifying a tool specific for testing the particular NFR from the plurality of production robots; and implementing the identified tool's application programming interface (API) to automatically execute a test scenario to validate the particular NFR, wherein the test scenario is selected from a plurality of test scenarios to be executed and tested by the production robots to validate each NFR during the development phase and to determine that the application is stable and ready for production based on validation of the plurality of NFRs prior to entering into a production phase of the application.

According to a further aspect of the present disclosure, wherein the production robots may be configured to: identify an NFR that was not tested and validated during the development phase; and automatically implement orchestrated actions during the production phase, without user intervention, to validate the identified NFR that was not tested and validated during the development phase.

According to yet another aspect of the present disclosure, wherein the production robots are configured to: validate the plurality of NFRs by automatically testing in a frequent manner or in a continuous manner during the development phase of the application, wherein the development phase is a lower environment compared to a production environment or a production-like environment of the production phase of a deployment pipeline; and determine that the application is stable and ready for production based on results of validations of the plurality of NFRs prior to entering into the production phase of the application.

According to a further aspect of the present disclosure, the method may further include running the automatic validation of the plurality of NFRs via the deployment pipeline, ad hoc or scheduled.

According to another aspect of the present disclosure, wherein the plurality of NFRs include one or more of the following NFRs: resiliency, performance, logging, monitoring, and other nonfunctional requirements identified for stability.

According to an additional aspect of the present disclosure, the method may further include: deploying the application being developed in a particular environment into a deployment pipeline that automatically implements the production robots to execute all nonfunctional test scenarios; determining, for each of the nonfunctional test scenario, a score, wherein the score is based on service level objective; storing the score in an NFR score card service after automatically testing all nonfunctional test scenarios; calling a toll gate API that receives the score from the NFR score card service; and determining whether the received score meets a predetermined threshold value by comparing the received score with a predefined score associated with passing of the application for production.

According to yet another aspect of the present disclosure, the method may further include: passing the application to go further in the deployment pipeline when it is determined that the received score meets the predetermined threshold value.

According to another aspect of the present disclosure, the method may further include: blocking the application to go further in the deployment pipeline when it is determined that the received score does not meet the predetermined threshold value, wherein the production robots are configured to automatically execute remediation processes to meet the predetermined threshold.

According to a further aspect of the present disclosure, a system for implementing an automation testing module for automated nonfunctional testing is disclosed. The system may include a processor; and a repository having one or more memories that include a plurality of test scenarios related to an application. The processor may be configured to: create a plurality of production robots each configured to validate a particular nonfunctional requirement (NFR) among a plurality of NFRs of the application during a development phase of the application; identify a tool specific for testing the particular NFR from the plurality of production robots; and implement the identified tool's application programming interface (API) to automatically execute a test scenario to validate the particular NFR, wherein the test scenario is selected from the plurality of test scenarios to be executed and tested by the production robots to validate each NFR during the development phase and to determine that the application is stable and ready for production based on validation of the plurality of NFRs prior to entering into a production phase of the application.

According to another aspect of the present disclosure, the processor may be further configured to run the automatic validation of the plurality of NFRs via a deployment pipeline, ad hoc or scheduled.

According to yet another aspect of the present disclosure, the processor may be further configured to: deploy the application being developed in a particular environment into a deployment pipeline that automatically implements the production robots to execute all nonfunctional test scenarios; determine, for each of the nonfunctional test scenario, a score, wherein the score is based on service level objective; store the score in an NFR score card service after automatically testing all nonfunctional test scenarios; call a toll gate API that receives the score from the NFR score card service; and determine whether the received score meets a predetermined threshold value by comparing the received score with a predefined score associated with passing of the application for production.

According to an aspect of the present disclosure, wherein the processor may be further configured to pass the application to go further in the deployment pipeline when it is determined that the received score meets the predetermined threshold value.

According to a further aspect of the present disclosure, the processor may be further configured to block the application to go further in the deployment pipeline when it is determined that the received score does not meet the predetermined threshold value, wherein the production robots are configured to automatically execute remediation processes to meet the predetermined threshold.

According to another aspect of the present disclosure, a non-transitory computer readable medium configured to store instructions for implementing an automation testing module for automated nonfunctional testing is disclosed. The instructions, when executed, may cause a processor to perform the following: creating a plurality of production robots each configured to validate a particular nonfunctional requirement (NFR) among a plurality of NFRs of an application during a development phase of the application; identifying a tool specific for testing the particular NFR from the plurality of production robots; and implementing the identified tool's application programming interface (API) to automatically execute a test scenario to validate the particular NFR, wherein the test scenario is selected from a plurality of test scenarios to be executed and tested by the production robots to validate each NFR during the development phase and to determine that the application is stable and ready for production based on validation of the plurality of NFRs prior to entering into a production phase of the application.

According to a further aspect of the present disclosure, when executed, the instructions may further cause the processor to perform the following: deploying the application being developed in a particular environment into a deployment pipeline that automatically implements the production robots to execute all nonfunctional test scenarios; determining, for each of the nonfunctional test scenario, a score, wherein the score is based on service level objective; storing the score in an NFR score card service after automatically testing all nonfunctional test scenarios; calling a toll gate API that receives the score from the NFR score card service; and determining whether the received score meets a predetermined threshold value by comparing the received score with a predefined score associated with passing of the application for production.

According to another aspect of the present disclosure, when executed, the instructions may further cause the processor to perform the following: passing the application to go further in the deployment pipeline when it is determined that the received score meets the predetermined threshold value.

According to yet another aspect of the present disclosure, when executed, the instructions may further cause the processor to perform the following: blocking the application to go further in the deployment pipeline when it is determined that the received score does not meet the predetermined threshold value, wherein the production robots are configured to automatically execute remediation processes to meet the predetermined threshold.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
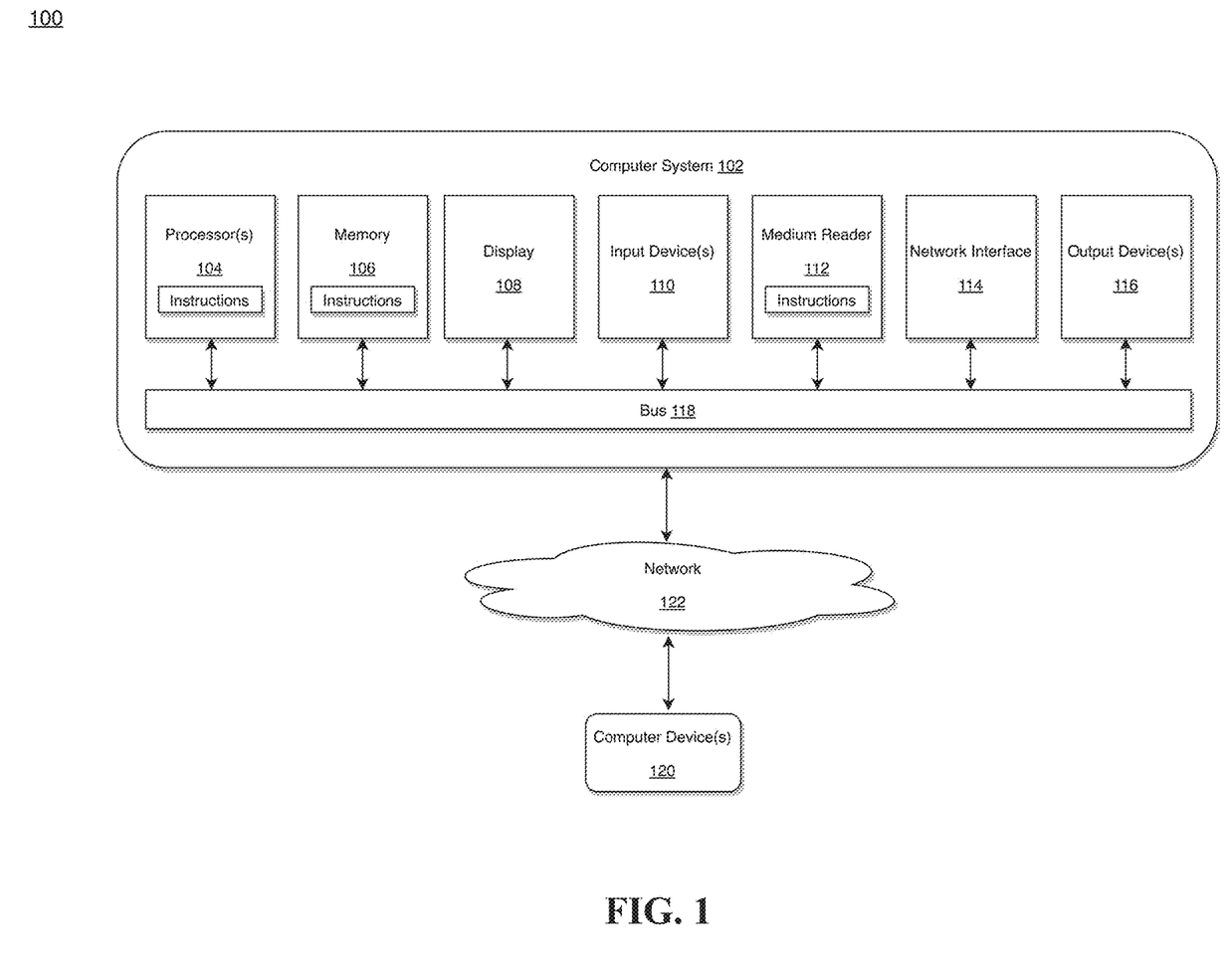
FIG. 1 illustrates a computer system for implementing an automation testing module in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and am non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an automation testing module for automating nonfunctional testing of software application much faster, easier and more efficient compared to conventional testing by creating a plurality of production robots. As disclosed herein, the various aspects, embodiments, features, and/or sub-components may also provide optimized processes of implementing an automation testing module for creating a plurality of production robots (i.e., various modules programmed to perform certain tasks) that focus on validating readiness of an application for production in the lower environments (i.e., in development environment or other lower environments prior to entering into production environment) by automatically testing frequently (or continuously) that nonfunctional requirements are met for resiliency, performance, monitoring, logging and other requirements identified for stability, but the disclosure is not limited thereto. In addition, various aspects, embodiments, features, and/or sub-components disclosed herein may also provide optimized processes of implementing an automation testing module for creating a plurality of production robots that, for any escapes of testing that make it to production environment, detect problems and orchestrate actions to remediate and prevent/reduce customer impacts, thereby allowing teams to spend more time focused on increasing the capabilities of the robots proactively versus reacting to incidents, but the disclosure is not limited thereto.

Figure 2:
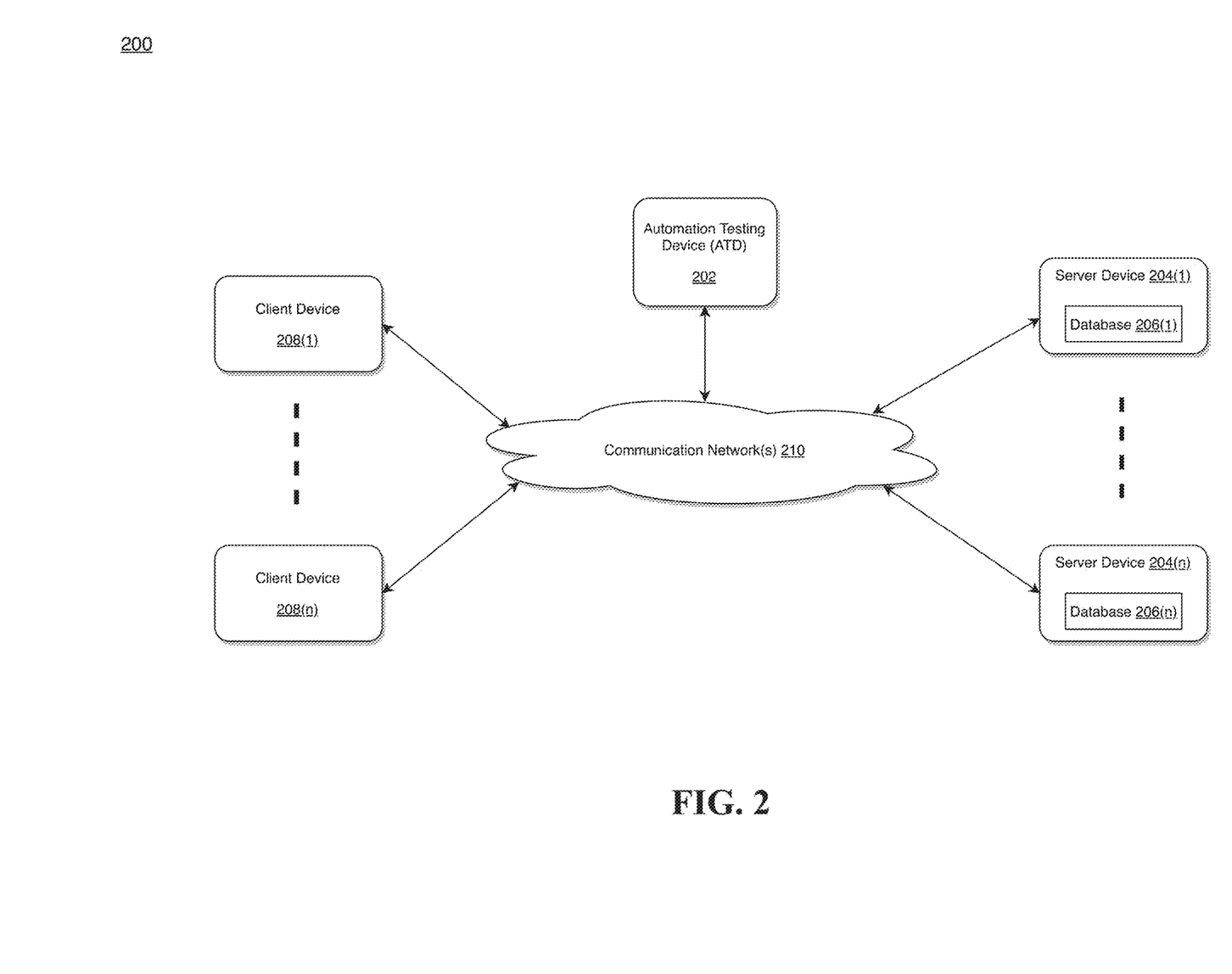
FIG. 2 illustrates an exemplary diagram of a network environment with an automation testing device in accordance with an exemplary embodiment.

Referring to FIG. 2, a schematic of an exemplary network environment 200 for implementing an automation testing device (ATD) of the instant disclosure is illustrated.

According to exemplary embodiments, the above-described problems associated with conventional testing system may be overcome by implementing an ATD 202 having an automation testing module as illustrated in FIG. 2 by creating a plurality of production robots (i.e., various modules programmed to perform certain tasks) that focus on validating readiness of an application for production in the lower environments (i.e., in development environment or other lower environments prior to entering into production environment) by automatically testing frequently (or continuously) that nonfunctional requirements are met for resiliency, performance, monitoring, logging and other requirements identified for stability, but the disclosure is not limited thereto.

The ATD 202 may be the same or similar to the computer system 102 as described with respect to FIG. 1.

The ATD 202 may store one or more applications that can include executable instructions that, when executed by the ATD 202, cause the ATD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ATD 202 itself, may be located in virtual server(s) running in a cloud-based computing environment rather than being tied to one or more specific physical network computing devices. Also, the application(s) may be running in one or more virtual machines (VMs) executing on the ATD 202. Additionally, in one or more embodiments of this technology, virtual machine(s) running on the ATD 202 may be managed or supervised by a hypervisor.

In the network environment 200 of FIG. 2, the ATD 202 is coupled to a plurality of server devices 204(1)-204(n) that hosts a plurality of databases 206(1)-206(n), and also to a plurality of client devices 208(1)-208(n) via communication network(s) 210. A communication interface of the ATD 202, such as the network interface 114 of the computer system 102 of FIG. 1, operatively couples and communicates between the ATD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ATD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ATD 202 may be a standalone device or integrated with one or more other devices or apparatuses, such as one or more of the server devices 204(1)-204(n), for example. In one particular example, the ATD 202 may be hosted by one of the server devices 204(1)-204(n), and other arrangements are also possible. Moreover, one or more of the devices of the ATD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ATD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ATD 202 that may be configured for creating a plurality of production robots (i.e., various modules programmed to perform certain tasks) that focus on validating readiness of an application for production in the lower environments (i.e., in development environment or other lower environments prior to entering into production environment) by automatically testing frequently (or continuously) that nonfunctional requirements are met for resiliency, performance, monitoring, logging and other requirements identified for stability, but the disclosure is not limited thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the ATD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ATD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ATD 202, the server devices 204(1)-204(n), or the client devices 208(1)-208(n), for example, may be configured to operate as virtual instances on the same physical machine. For example, one or more of the ATD 202, the server devices 204(1)-204(n), or the client devices 208(1)-208(n) may operate on the same physical device rather than as separate devices communicating through communication network(s) 210. Additionally, there may be more or fewer ATDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
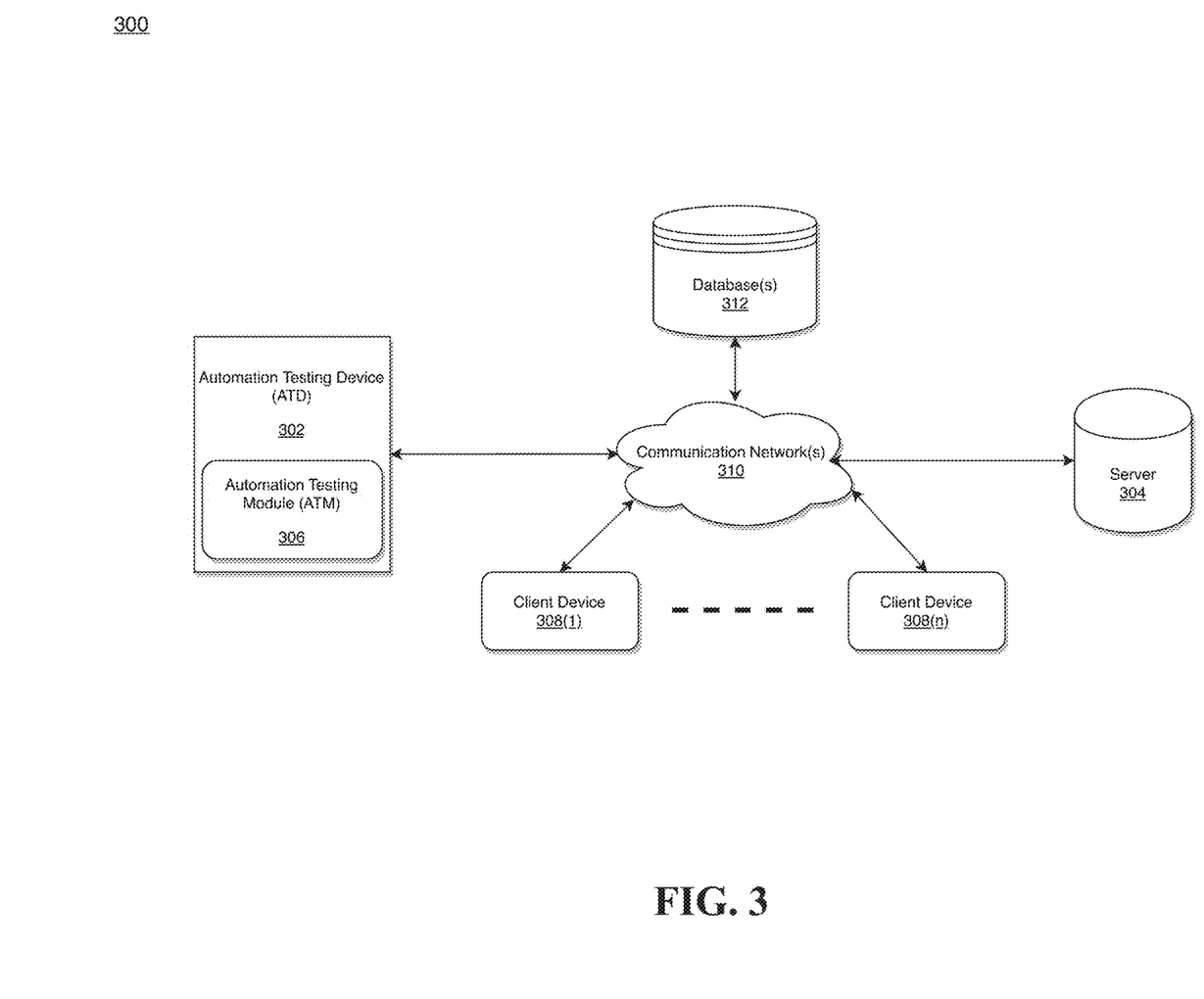
FIG. 3 illustrates a system diagram for implementing an automation testing device with an automation testing module in accordance with an exemplary embodiment.

FIG. 3 illustrates a system diagram for implementing an automation testing device (ATD) with an automation testing module (ATM) in accordance with an exemplary embodiment.

As illustrated in FIG. 3, the ATD 302 including the ATM 306 may be connected to a server 304, and a database(s) 312 via a communication network 310. The ATD 302 may also be connected to a plurality of client devices 308(1)-308(n) via the communication network 310, but the disclosure is not limited thereto. According to exemplary embodiments, the ATM 306 may be implemented within the client devices 308(1)-308(n), but the disclosure is not limited thereto. According to exemplary embodiments, the client devices 308(1)-308(n) may be utilized by software application developers, but the disclosure is not limited thereto.

According to exemplary embodiment, the ATD 302 is described and shown in FIG. 3 as including the ATM 306, although it may include other rules, policies, modules, databases, or applications, for example. According to exemplary embodiments, the database(s) 312 may be embedded within the ATD 302. Although only one database(s) 312 is illustrated in FIG. 3, according to exemplary embodiments, a plurality of database(s) 312 may be provided. The database(s) 312 may include one or more memories configured to store information including: rules, programs, production requirements, configurable threshold values defined by a product team to validate against service level objective (SLO), test cases, test scenarios, production robots (i.e., modules programmed to perform a particular task in testing a software application) framework templates, etc., but the disclosure is not limited thereto. According to exemplary embodiments, the ATM 306 may be configured to be storage platform agnostic—configured to be deployed across multiple storage layers.

According to exemplary embodiments, the ATM 306 may be configured to receive continuous feed of data from the database(s) 312 via the communication network 310.

As will be described below, the ATM 306 may be configured to create a plurality of production robots each configured to validate a particular nonfunctional requirement (NFR) among a plurality of NFRs of an application during a development phase of the application; identify a tool specific for testing the particular NFR from the plurality of production robots; and implement the identified tool's application programming interface (API) to automatically execute a test scenario to validate the particular NFR, wherein the test scenario is selected from a plurality of test scenarios to be executed and tested by the production robots to validate each NFR during the development phase and to determine that the application is stable and ready for production based on validation of the plurality of NFRs prior to entering into a production phase of the application, but the disclosure is not limited thereto.

The plurality of client devices 308(l)-308(n) are illustrated as being in communication with the ATD 302. In this regard, the plurality of client devices 308(1)-308(n) may be "clients" of the ATD 302 and are described herein as such. Nevertheless, it is to be known and understood that the plurality of client devices 308(1)-308(n) need not necessarily be "clients" of the ATD 302, or any entity described in association therewith herein. Any additional or alternative relationship may exist between either or more of the plurality of client devices 308(1)-308(n) and the ATD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the ATD 302 via broadband or cellular communication. Of course, these embodiments are merely exemplary and are not limiting or exhaustive.

Figure 4:
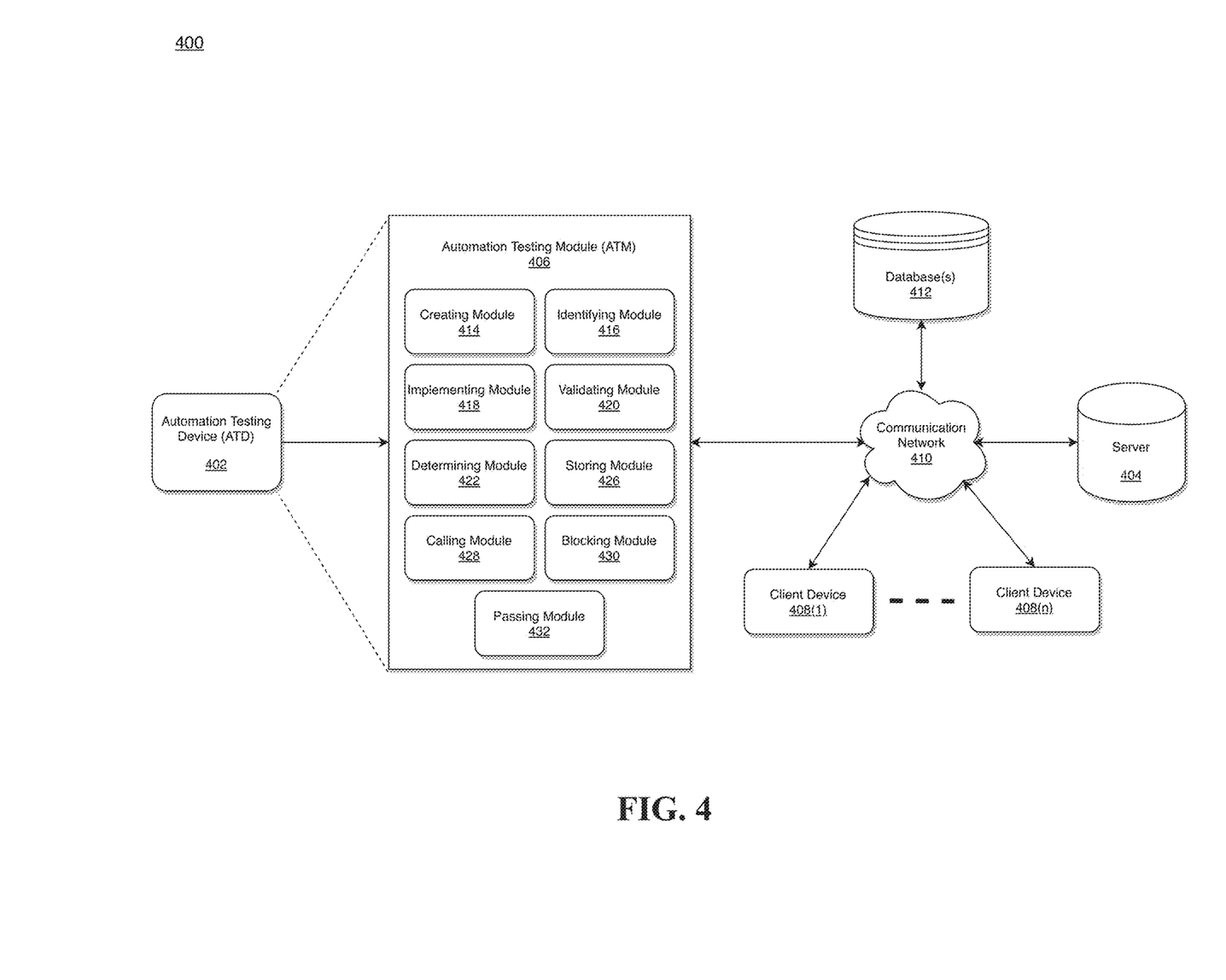
FIG. 4 illustrates a system diagram for implementing an automation testing module of FIG. 3 in accordance with an exemplary embodiment.

FIG. 4 illustrates a system diagram for implementing an automation testing module of FIG. 3 in accordance with an exemplary embodiment. As illustrated in FIG. 4, the system 400 may include an automation testing device (ATD) 402 within which an automation testing module (ATM) 406 may be embedded, a database(s) 412, a server 404, client devices 408(1)-408(n), and a communication network 410. According to exemplary embodiments, the ATD 402, ATM 406, database(s) 412, the server 404, the client devices 408(1)-408(n), and the communication network 410 as illustrated in FIG. 4 may be the same or similar to the ATD 302, the ATM 306, the database(s) 312, the server 304, the client devices 308(1)-308(n), and the communication network 310, respectively, as illustrated in FIG. 3.

Figure 4A:
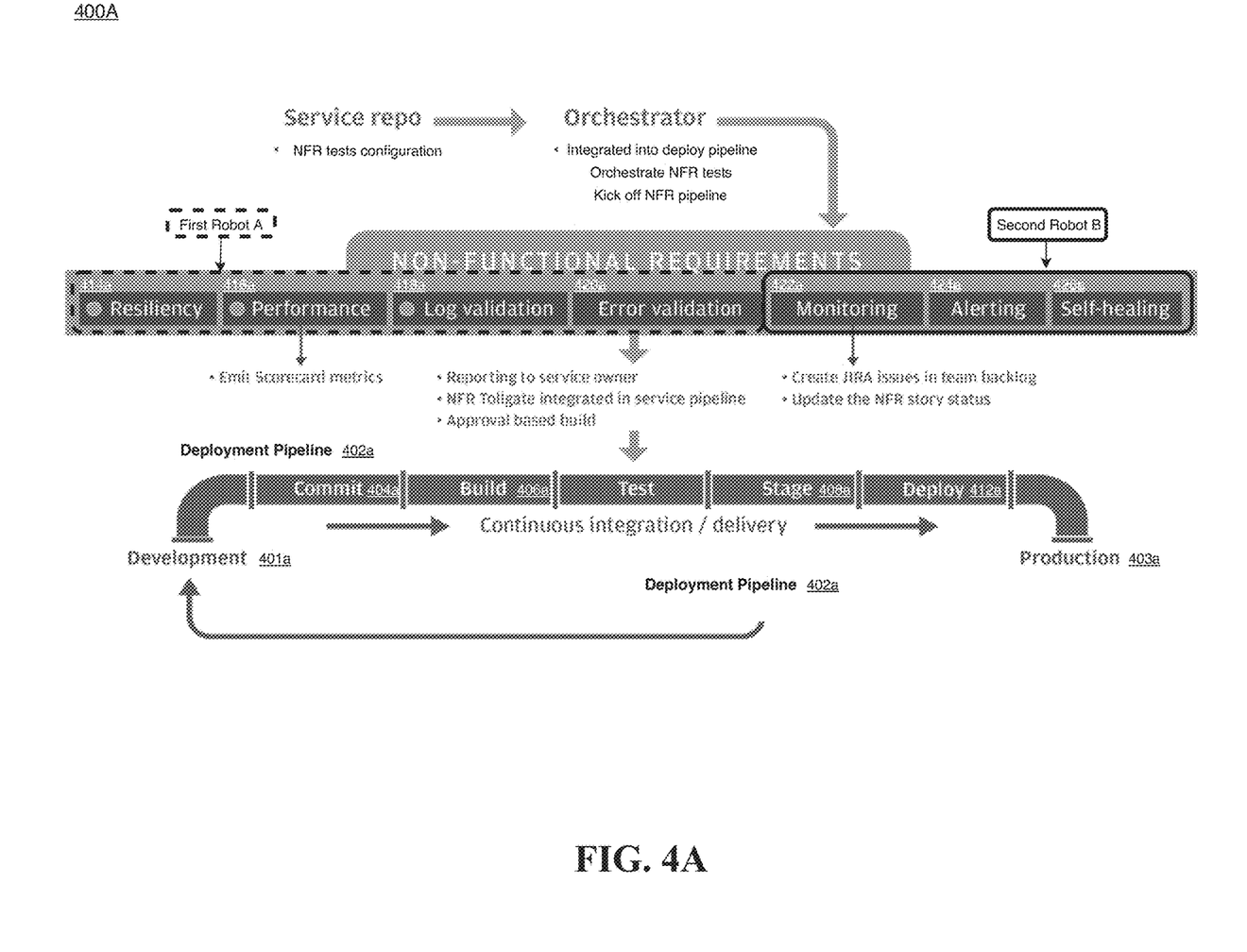
FIG. 4A illustrates an exemplary deployment pipeline in accordance with an exemplary embodiment.

FIG. 4A illustrates a process 400A which illustrates exemplary NFRs of an application being developed via a deployment pipeline 402a utilized by the ATM 406 of FIG. 4. For example, according to exemplary embodiments, the deployment pipeline 402a may include the following elements starting from development 401a to all the way to production 403a: commit 404a, build 406a, test stage 408a, and deploy 412a. The NFRs may include, but not limited thereto, resiliency 414a, performance 416a, log validation 418a, error validation 420a, monitoring 422a, alerting 424a, and self-healing 426a, etc.

As illustrated in FIG. 4, the ATM 406 may include a creating module 414, an identifying module 416, an implementing module 418, a validating module 420, a determining module 422, a storing module 426, a calling module 428, a blocking module 430, and a passing module 432. According to exemplary embodiments, the database(s) 412 may be external to the ATD 402 may include various systems that are managed and operated by an organization. Alternatively, according to exemplary embodiments, the database(s) 412 may be embedded within the ATD 402 and/or the ATM 406

The process may be executed via the communication network 410, which may comprise plural networks as described above. For example, in an exemplary embodiment, the various components of the ATM 406 may communicate with the server 404, and the database(s) 412 via the communication network 410. Of course, these embodiments are merely exemplary and are not limiting or exhaustive.

According to exemplary embodiments, the communication network 410 may be configured to establish a link between the database(s) 412, the client devices 408(1)-408(n) and the ATM 406.

According to exemplary embodiments, each of the creating module 414, identifying module 416, implementing module 418, validating module 420, determining module 422, storing module 426, calling module 428, blocking module 430, and the passing module 432 may be implemented by microprocessors or similar, they may be programmed using software (e.g., microcode) to perform various functions discussed herein and may optionally be driven by firmware and/or software. Alternatively, each of the creating module 414, identifying module 416, implementing module 418, validating module 420, determining module 422, storing module 426, calling module 428, blocking module 430, and the passing module 432 may be implemented by dedicated hardware, or as a combination of dedicated hardware to perform some functions and a processor (e.g., one or more programmed microprocessors and associated circuitry) to perform other functions. Also, according to exemplary embodiments, each of the creating module 414, identifying module 416, implementing module 418, validating module 420, determining module 422, storing module 426, calling module 428, blocking module 430, and the passing module 432 may be physically separated into two or more interacting and discrete blocks, units, devices, and/or modules without departing from the scope of the inventive concepts.

Referring to FIGS. 4 and 4A, according to exemplary embodiments, the creating module 414 may be configured to create a plurality of production robots each configured to validate a particular nonfunctional requirement (NFR) among a plurality of NFRs (e.g., resiliency 414a, performance 416a, log validation 418a, error validation 420a) of an application during a development phase of the application (e.g., development 401a).

According to exemplary embodiments, the identifying module 416 may be configured to identify a tool specific for testing the particular NFR from the plurality of production robots. According to exemplary embodiments, each production robot may be referred to as modules programmed to perform a particular task. A group of production robots may be configured for testing and validating resiliency 414a, performance 416a, log validation 418a, and error validation 420a, as well as framework design during development 401a as further disclosed in details below, but the disclosure is not limited thereto. For example, these group of production robots may be components of a single robot (i.e., a first robot A). Thus, according to exemplary embodiments, the first robot A may be configured for testing and validating resiliency 414a, performance 416a, log validation 418a, and error validation 420a, as well as framework design during development 401a.

Another group of production robots may be configured for monitoring 422a, alerting 424a, and self-healing 426a as further disclosed in details below, but the disclosure is not limited thereto. For example, these another group of production robots may be components of another single robot (i.e., a second robot B). Thus, according to exemplary embodiments, the second robot B may be configured for monitoring 422a, alerting 424a, and self-healing 426a during production 403a.

Thus, according to exemplary embodiments, the first robot A does the validation in the lower environments but does not perform any remediation. It is only the second robot B that performs remediation in the production environment for self-healing.

According to exemplary embodiments, the implementing module 418 may be configured to implement the identified tool's application programming interface (API) to automatically execute a test scenario to validate the particular NFR. The test scenario may be selected from a plurality of test scenarios stored in the database(s) 412 to be executed and tested by the production robots to validate each NFR during the development phase.

According to exemplary embodiments, the plurality of NFRs may include one or more of the following NFRs: resiliency, performance, logging, monitoring, and other nonfunctional requirements identified for stability, but the disclosure is not limited thereto.

Referring to FIGS. 4 and 4A, for example, for log validation 418a, according to exemplary embodiments, the identifying module 416 may be configured to identify a logging tool. The logging tool may provide software to consolidate and index any log and machine data, including structured, unstructured and complex multi-line application logs. According to exemplary embodiments, the ATM 406 may be configured to collect, store, index, search, correlate, visualize, analyze and report on any machine-generated data to identify and resolve operational and security issues in a faster, repeatable and more affordable way. According to exemplary embodiments, the logging tool may be a fully integrated solution for log management data collection, storage and visualization. The validating module 420 of the ATM 406 may utilize the logging tool's API to automatically validate whether the application logs are meeting the requirements or not.

Similarly, for performance 416a, according to exemplary embodiments, the identifying module 416 of the ATM 406 may be configured to identify a tool for performance and utilize the tool for performance to generate the load onto the platform/application. According to exemplary embodiments, the validating module 420 may be configured to utilize tool's API to automatically execute the test and validate the test for performance.

For resiliency 414a, according to exemplary embodiments, the identifying module 416 of the ATM 406 may be configured to identify a tool for resiliency and the validating module 420 of the ATM 406 may be configured to utilize the tool's API to perform different resiliency experiments and validate via the API whether the resiliency experiments are successful or not.

Thus, according to exemplary embodiments, the ATM 406 may be configured to identify tools to perform actions and utilize the tools' APIs for automatically executing a plurality of test scenarios (e.g., hundreds of test scenarios) that should be executed and tested before determining that the application being developed is stable and ready for production.

Conventionally, testing for NFRs is not performed in the development environment. But, according to exemplary embodiments, the ATM 406 may be configured to allow testing of the NFRs as early as in the development phase (i.e., lower environment than the conventional testing environment or production/production like environment), thereby substantially improving production quality and time.

According to exemplary embodiments, the determining module 422 may be configured to determine that the application is stable and ready for production based on validation of the plurality of NFRs prior to entering into a production phase (i.e., production 403a) of the application. One of ordinary skill in the art would readily understand that the production phase is at a higher environment compared to development phase which is at a lower environment in a software development and production pipeline (i.e., deployment pipeline 402a). According to exemplary embodiments, the passing module 432 may be configured to pass the application for production when the determining module 422 determines that all NFRs are valid and meet predetermined thresholds defined by a product team. The configurable thresholds defined by the product team may be utilized by the validating module 420 to validate these NFRs against SLO.

According to exemplary embodiments, the production robots (i.e., the production robots that are responsible for monitoring 422a, alerting 424a, and self-healing 426a as illustrated in FIG. 4A) created by the creating module 414 may be configured to implement the identifying module 416 to identify an NFR that was not tested and validated by the validating module 420 during the development phase. According to exemplary embodiments, the production robots created by the creating module 414 may be configured to implement the implementing module 418 to automatically implement orchestrated actions during the production phase, without user intervention, to validate the identified NFR that was not tested and validated during the development phase. Thus, according to exemplary embodiments, the production robots (i.e., the production robots that are responsible for monitoring 422a, alerting 424a, and self-healing 426a as illustrated in FIG. 4A) created by the creating module 414 may be configured to execute recovery actions against potential defined failure scenarios in production. These robots may also be configured to implement GLB automated action, Kafka automated action, Cassandra automated action, Apigee automated action. GAIA automated recovery action, recovery action orchestration, rule based engine, and design, but the disclosure is not limited thereto.

According to exemplary embodiments, the production robots created by the creating module 414 may also be configured to implement the validating module 420 to validate the plurality of NFRs by automatically testing in a frequent manner or in a continuous manner during the development phase of the application (see, e.g., FIG. 4A). According to exemplary embodiments, the development phase is a lower environment compared to a production environment or a production-like environment of the production phase of a deployment pipeline (e.g., deployment pipeline 402a as illustrated in FIG. 4A). According to exemplary embodiments, the production robots (e.g., the production robots responsible for testing and validating resiliency 414a, performance 416a, log validation 418a and error validation 420a as illustrated in FIG. 4A) created by the creating module 414 may also be configured to implement the determining module 422 to determine that the application is stable and ready for production based on results of validations of the plurality of NFRs by the validating module 420 prior to entering into the production phase of the application.

According to exemplary embodiments, the ATM 406 may be configured to run the automatic validation of the application (i.e., a functional application) against the plurality of NFRs via the deployment pipeline 402a, ad hoc or scheduled. The deployment pipeline 402a deploys the functional application itself.

According to exemplary embodiments, the deployment pipeline 402a may also be configured to deploy the functional application being developed in a particular environment into the deployment pipeline 402a that automatically implements the production robots to execute all nonfunctional test scenarios. The determining module 422 may be configured to determine, for each of the nonfunctional test scenario, a score. According to exemplary embodiments, the score may be based on service level objective. The storing module 426 may be configured to store the score in an NFR score card service after automatically testing all nonfunctional test scenarios by the ATM 406. The calling module 428 may be configured to call a toll gate API that receives the score from the NFR score card service. The NFR score card service may be stored in the database(s) 412.

According to exemplary embodiments, the determining module 422 may be configured to determine whether the received score meets a predetermined threshold value by comparing the received score with a predefined score associated with passing of the application for production. According to exemplary embodiments, the predefined score may be a value within the range of 80%-99% depending on a production team's desired requirements for passing an application for production, but the disclosure is not limited thereto. According to exemplary embodiments, the passing module 432 may be configured to pass the application to go further in the deployment pipeline 402a when the determining module 422 determines that the received score meets the predetermined threshold value.

According to exemplary embodiments, the blocking module 430 may be configured to block the application to go further in the deployment pipeline 402a when the determining module 422 determines that the received score does not meet the predetermined threshold value. The production robots created by the creating module 414 may be configured to automatically execute remediation processes to meet the predetermined threshold. Thus, the production robots created by the creating module 414 may be configured to run smaller tests as early as in the development environment as the application development progresses. Thus, when the application reach in the production environment, the application has already been valid 100% tested for nonfunctional requirements.

According to exemplary embodiments, when the deployment pipeline 402a (different micro service than the NFR score card service) is deployed in a particular environment, it automatically starts the above-described tools which automatically execute all these nonfunctional test scenarios, and for each of the test, determines a score and that score is captured and stored in the NFR score card service in the manner described above. For example, after all the tests are done, which would be a large number, the application is deployed again into the same deployment pipeline 402a and the calling module 428 calls a toll gate API which gets the score out of the NFR score card service and the determining module 422 determines whether the score meets a predetermined threshold value. If the determining module 422 determines that the score does not meet the predetermined threshold value, the toll gate API (i.e., the blocking module 430) blocks the application from going into production 403a. If the determining module 422 determines that the score meets the predetermined threshold value (e.g., performance criteria or success criteria), the passing module 432 will pass the application to go further in the deployment pipeline 402a in the higher environment. The scores may be based on SLO (service level objective).

According to exemplary embodiments, the creating module 414 of the ATM 406 may be configured to create a configuration file that lists every single test that this application needs to pass. The storing module 426 of the ATM 406 may be configured to store the configuration file into the NFR score card service (or database 412). That NFR score card service may provide an average value that the application is supposed to pass a certain percentage (e.g., a percentage between 80%-99%, but the disclosure is not limited thereto) of all of these tests and it will return that number over to the deployment pipeline 402a.

According to exemplary embodiments, the deployment pipeline 402a may be a suite of plugins which supports implementing and integrating continuous delivery pipelines into Jenkins. The deployment pipeline 402a may provide an extensible set of tools for modeling simple-to-complex delivery pipelines "as code" via the Pipeline domain-specific language (DSL) syntax. The definition of the deployment pipeline 402a may be written into a text file (e.g., a Jenkinsfile) which in turn can be committed to a project's source control repository. According to exemplary embodiments, the deployment pipeline's tool may look at the number and if the number is determined to be above the predetermined threshold value, the tool may continue performing whatever it was doing in the deployment pipeline 402a. If not, the tool may generate an error and a developer may be required to fix the error right there to continue development 401a, thereby making sure that the application is fully cooperative or functional to go even into the production environment (i.e., production 403a).

According to exemplary embodiments, when the application is in the production environment, the production robots created by the creating module 414 of the ATM 406 may be configured to perform self-healing 426a. For example, if something happens in the environment that the ATM 406 did not test for or if it is a different type of test, the production robots may be configured to read that and make a decision based on a decision tree (i.e., a logic tree similar to artificial intelligence) and may output a result that this particular application is defective due to this particular location or region and that restart may be necessary just for that defective one. Thus, according to exemplary embodiments, the ATM 406 may be configured to implement intelligent orchestration in the production environment to take action and open tickets to mitigate impacts without human intervention.

According to exemplary embodiments, the ATM 406 may be configured to leverage machine learning to automatically create new experiments for NFR validation and determine production remediation actions.

According to exemplary embodiments, the ATM 406 may be also be configured to automate gathering the production load patterns and replay them in the performance environment with no manual intervention.

According to exemplary embodiments, the ATM 406 may also be configured to automatically notify specific customers on potential problems with specific examples prior to becoming a larger issue by learning customer behaviors.

According to exemplary embodiments, a non-transitory computer readable medium may be configured to store instructions for integrating data. According to exemplary embodiments, the instructions, when executed, may cause a processor embedded within the ATM 406 or the ATD 402 to perform the following: creating a plurality of production robots each configured to validate a particular nonfunctional requirement (NFR) among a plurality of NFRs of an application during a development phase of the application; identifying a tool specific for testing the particular NFR from the plurality of production robots; and implementing the identified tool's application programming interface (API) to automatically execute a test scenario to validate the particular NFR, wherein the test scenario is selected from a plurality of test scenarios to be executed and tested by the production robots to validate each NFR during the development phase and to determine that the application is stable and ready for production based on validation of the plurality of NFRs prior to entering into a production phase of the application. The processor may be the same or similar to the processor 104 as illustrated in FIG. 1 or the processor embedded within ATD 202, ATD 302, ATM 306. ATD 402, and ATM 406.

According to exemplary embodiments, the instructions, when executed, may further cause the processor 104 to perform the following: deploying the application being developed in a particular environment into a deployment pipeline that automatically implements the production robots to execute all nonfunctional test scenarios; determining, for each of the nonfunctional test scenario, a score, wherein the score is based on service level objective; storing the score in an NFR score card service after automatically testing all nonfunctional test scenarios; calling a toll gate API that receives the score from the NFR score card service; and determining whether the received score meets a predetermined threshold value by comparing the received score with a predefined score associated with passing of the application for production.

According to exemplary embodiments, the instructions, when executed, may further cause the processor 104 to perform the following: passing the application to go further in the deployment pipeline when it is determined that the received score meets the predetermined threshold value.

According to exemplary embodiments, the instructions, when executed, may further cause the processor 104 to perform the following: blocking the application to go further in the deployment pipeline when it is determined that the received score does not meet the predetermined threshold value, wherein the production robots are configured to automatically execute remediation processes to meet the predetermined threshold.

Figure 5:
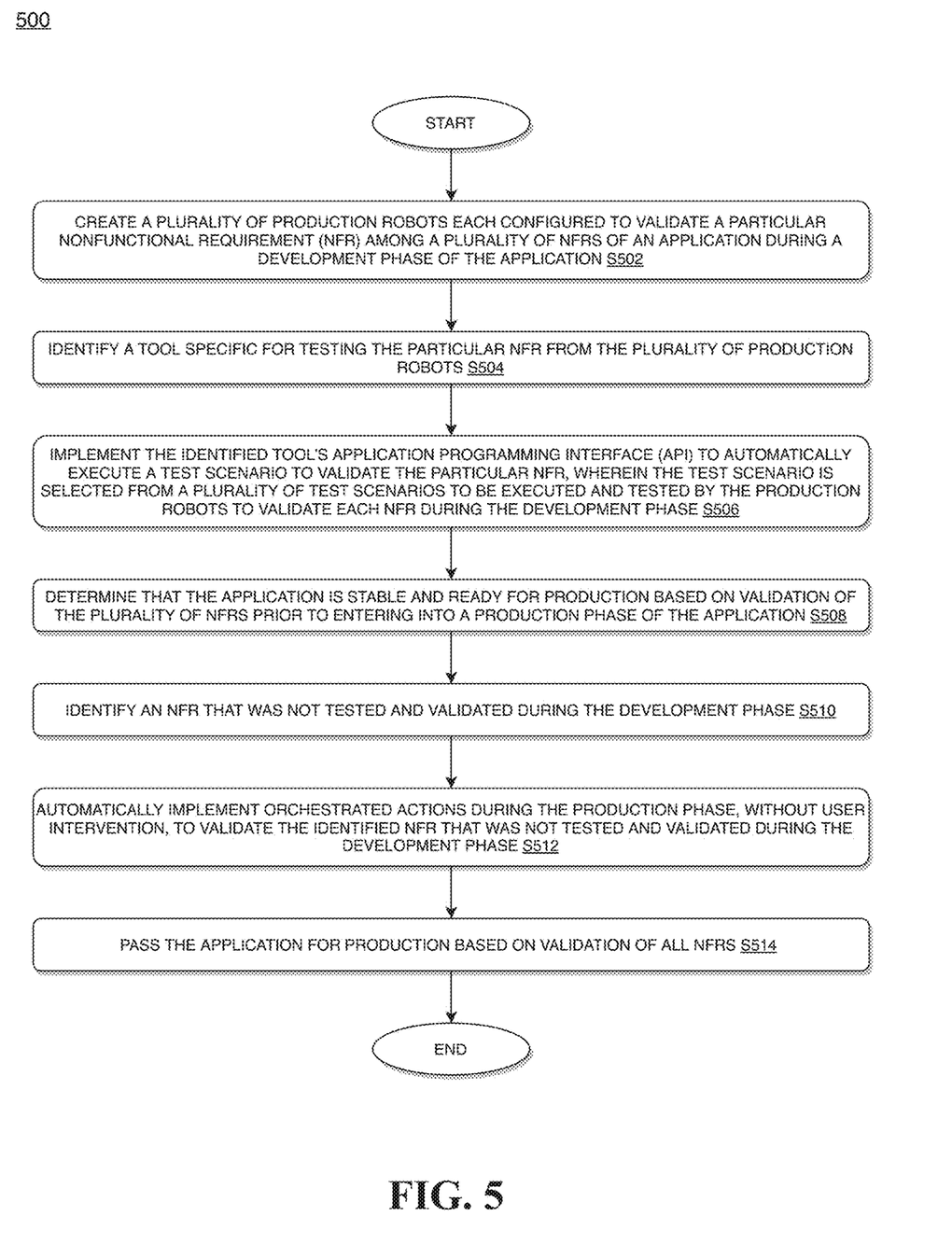
FIG. 5 illustrates a flow diagram for implementing an automation testing module in accordance with an exemplary embodiment.

FIG. 5 illustrates a flow diagram for implementing an automation testing module for automated nonfunctional testing by utilizing one or more processors and one or more memories in accordance with an exemplary embodiment.

In the process 500 of FIG. 5, at step S502, a plurality of production robots may be created. Each of the production robot may be configured to validate a particular nonfunctional requirement (NFR) among a plurality of NFRs of an application during a development phase of the application.

According to exemplary embodiments, at step S504, a tool specific for testing the particular NFR may be identified from the plurality of production robots.

According to exemplary embodiments, at step S506, the identified tool's application programming interface (API) may be implemented to automatically execute a test scenario to validate the particular NFR. The test scenario may be selected from a plurality of test scenarios to be executed and tested by the production robots to validate each NFR during the development phase.

According to exemplary embodiments, at step S508, it may be determined that the application is stable and ready for production based on validation of the plurality of NFRs prior to entering into a production phase of the application.

According to exemplary embodiments, at step S510, the process 500 may further include creating the production robots to: identify an NFR that was not tested and validated during the development phase.

According to exemplary embodiments, at step S512, the process 500 may further include creating the production robots to automatically implement orchestrated actions during the production phase, without user intervention, to validate the identified NFR that was not tested and validated during the development phase.

According exemplary embodiments, at step S514, the process 500 may further include passing the application for production based on validation of all NFRs.

According to exemplary embodiments, the process 500 may further include creating the production robots to: validate the plurality of NFRs by automatically testing in a frequent manner or in a continuous manner during the development phase of the application, wherein the development phase is a lower environment compared to a production environment or a production-like environment of the production phase of a deployment pipeline; and determine that the application is stable and ready for production based on results of validations of the plurality of NFRs prior to entering into the production phase of the application.

According to exemplary embodiments, the process 500 may further include: running the automatic validation of the plurality of NFRs via the deployment pipeline, ad hoc or scheduled.

According to exemplary embodiments, the process 500 may further include: deploying the application being developed in a particular environment into a deployment pipeline that automatically implements the production robots to execute all nonfunctional test scenarios; determining, for each of the nonfunctional test scenario, a score, wherein the score is based on service level objective; storing the score in an NFR score card service after automatically testing all nonfunctional test scenarios; calling a toll gate API that receives the score from the NFR score card service; and determining whether the received score meets a predetermined threshold value by comparing the received score with a predefined score associated with passing of the application for production.

According to exemplary embodiments, the process 500 may further include: passing the application to go further in the deployment pipeline when it is determined that the received score meets the predetermined threshold value.

According to exemplary embodiments, the process 500 may further include: blocking the application to go further in the deployment pipeline when it is determined that the received score does not meet the predetermined threshold value, wherein the production robots are configured to automatically execute remediation processes to meet the predetermined threshold.

According to exemplary embodiments as disclosed above in FIGS. 1-5, technical improvements effected by the instant disclosure may include platforms for implementing an automation testing module for creating a plurality of production robots (i.e., various modules programmed to perform certain tasks) that focus on validating readiness of an application for production in the lower environments (i.e., in development environment or other lower environments prior to entering into production environment) by automatically testing frequently (or continuously) that nonfunctional requirements are met for resiliency, performance, monitoring, logging and other requirements identified for stability, but the disclosure is not limited thereto. According to exemplary embodiments as disclosed above in FIGS. 1-5, technical improvements effected by the instant disclosure may further include platforms for implementing an automation testing module for creating a plurality of production robots that, for any escapes of testing that make it to production environment, detect problems and orchestrate actions to remediate and prevent/reduce customer impacts, thereby allowing teams to spend more time focused on increasing the capabilities of the robots proactively versus reacting to incidents, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an automation testing module for automated nonfunctional testing by utilizing one or more processors and one or more memories, the method comprising:

creating a plurality of production robots each configured to validate a particular nonfunctional requirement (NFR) among a plurality of NFRs of an application during a development phase of the application;

identifying a tool specific for testing the particular NFR from the plurality of production robots; and implementing the identified tool's application programming interface (API) to automatically execute a test scenario to validate the particular NFR, wherein the test scenario is selected from a plurality of test scenarios to be executed and tested by the production robots to validate each NFR during the development phase and to determine that the application is stable and ready for production based on validation of the plurality of NFRs prior to entering into a production phase of the application, wherein the production robots are configured to:
identify an NFR that was not tested and validated during the development phase; and
automatically implement orchestrated actions during the production phase, without user intervention, to validate the identified NFR that was not tested and validated during the development phase.

2. The method according to claim 1, wherein the production robots are configured to:
validate the plurality of NFRs by automatically testing in a frequent manner or in a continuous manner during the development phase of the application, wherein the development phase is a lower environment compared to a production environment or a production-like environment of the production phase of a deployment pipeline; and
determine that the application is stable and ready for production based on results of validations of the plurality of NFRs prior to entering into the production phase of the application.

3. The method according to claim 2, further comprising running the automatic validation of the plurality of NFRs via the deployment pipeline, ad hoc or scheduled.

4. The method according to claim 1, wherein the plurality of NFRs include one or more of the following NFRs: resiliency, performance, logging, monitoring, and other nonfunctional requirements identified for stability.

5. The method according to claim 1, the method further comprising:
deploying the application being developed in a particular environment into a deployment pipeline that automatically implements the production robots to execute all nonfunctional test scenarios;
determining, for each of the nonfunctional test scenario, a score, wherein the score is based on service level objective;
storing the score in an NFR score card service after automatically testing all nonfunctional test scenarios;
calling a toll gate API that receives the score from the NFR score card service; and
determining whether the received score meets a predetermined threshold value by comparing the received score with a predefined score associated with passing of the application for production.

6. The method according to claim 5, further comprising: passing the application to go further in the deployment pipeline when it is determined that the received score meets the predetermined threshold value.

7. The method according to claim 5, further comprising:
blocking the application to go further in the deployment pipeline when it is determined that the received score does not meet the predetermined threshold value, wherein the production robots are configured to automatically execute remediation processes to meet the predetermined threshold.

8. A system for implementing an automation testing module for automated nonfunctional testing, comprising:
a processor; and
a repository having one or more memories that include a plurality of test scenarios related to an application;
wherein the processor is configured to:
create a plurality of production robots each configured to validate a particular nonfunctional requirement (NFR) among a plurality of NFRs of the application during a development phase of the application;
identify a tool specific for testing the particular NFR from the plurality of production robots; and
implement the identified tool's application programming interface (API) to automatically execute a test scenario to validate the particular NFR, wherein the test scenario is selected from the plurality of test scenarios to be executed and tested by the production robots to validate each NFR during the development phase and to determine that the application is stable and ready for production based on validation of the plurality of NFRs prior to entering into a production phase of the application,
wherein the production robots are configured to:
identify an NFR that was not tested and validated during the development phase; and
automatically implement orchestrated actions during the production phase, without user intervention, to validate the identified NFR that was not tested and validated during the development phase.

9. The system according to claim 8, wherein the production robots are configured to:
validate the plurality of NFRs by automatically testing in a frequent manner or in a continuous manner during the development phase of the application, wherein the development phase is a lower environment compared to a production environment or a production-like environment of the production phase of a deployment pipeline; and
determine that the application is stable and ready for production based on results of validations of the plurality of NFRs prior to entering into the production phase of the application.

10. The system according to claim 9, wherein the processor is further configured to run the automatic validation of the plurality of NFRs via the deployment pipeline, ad hoc or scheduled.

11. The system according to claim 8, wherein the plurality of NFRs include one or more of the following NFRs: resiliency, performance, logging, monitoring, and other nonfunctional requirements identified for stability.

12. The system according to claim 8, wherein the processor is further configured to:
deploy the application being developed in a particular environment into a deployment pipeline that automatically implements the production robots to execute all nonfunctional test scenarios;
determine, for each of the nonfunctional test scenario, a score, wherein the score is based on service level objective;
store the score in an NFR score card service after automatically testing all nonfunctional test scenarios;
call a toll gate API that receives the score from the NFR score card service; and
determine whether the received score meets a predetermined threshold value by comparing the received score with a predefined score associated with passing of the application for production.

13. The system according to claim 12, wherein the processor is further configured to pass the application to go further in the deployment pipeline when it is determined that the received score meets the predetermined threshold value.

14. The system according to claim 12, wherein the processor is further configured to block the application to go further in the deployment pipeline when it is determined that the received score does not meet the predetermined threshold value, wherein the production robots are configured to automatically execute remediation processes to meet the predetermined threshold.

15. A non-transitory computer readable medium configured to store instructions for implementing an automation testing module for automated nonfunctional testing, wherein when executed, the instructions cause a processor to perform the following:
creating a plurality of production robots each configured to validate a particular nonfunctional requirement (NFR) among a plurality of NFRs of an application during a development phase of the application;
identifying a tool specific for testing the particular NFR from the plurality of production robots; and
implementing the identified tool's application programming interface (API) to automatically execute a test scenario to validate the particular NFR, wherein the test scenario is selected from a plurality of test scenarios to be executed and tested by the production robots to validate each NFR during the development phase and to determine that the application is stable and ready for production based on validation of the plurality of NFRs prior to entering into a production phase of the application,
wherein the production robots are configured to:
identify an NFR that was not tested and validated during the development phase; and
automatically implement orchestrated actions during the production phase, without user intervention, to validate the identified NFR that was not tested and validated during the development phase.

16. The non-transitory computer readable medium according to claim 15, wherein when executed, the instructions further cause the processor to perform the following:
deploying the application being developed in a particular environment into a deployment pipeline that automatically implements the production robots to execute all nonfunctional test scenarios;
determining, for each of the nonfunctional test scenario, a score, wherein the score is based on service level objective;
storing the score in an NFR score card service after automatically testing all nonfunctional test scenarios;
calling a toll gate API that receives the score from the NFR score card service; and
determining whether the received score meets a predetermined threshold value by comparing the received score with a predefined score associated with passing of the application for production.

17. The non-transitory computer readable medium according to claim 16, wherein when executed, the instructions further cause the processor to perform the following:
passing the application to go further in the deployment pipeline when it is determined that the received score meets the predetermined threshold value; and
blocking the application to go further in the deployment pipeline when it is determined that the received score does not meet the predetermined threshold value, wherein the production robots are configured to automatically execute remediation processes to meet the predetermined threshold.

18. The non-transitory computer readable medium according to claim 17, wherein the plurality of NFRs include one or more of the following NFRs: resiliency, performance, logging, monitoring, and other nonfunctional requirements identified for stability.

\* \* \* \* \*